United States Patent [19]
Johnson

[11] 4,088,519
[45] May 9, 1978

[54] HEAT CONTROL FOR ULTRASONIC PATTERN ROLLS

[75] Inventor: Charles A. Johnson, Rockingham, N.C.

[73] Assignee: Home Curtain Corp., Far Rockaway, N.Y.

[21] Appl. No.: 796,413

[22] Filed: May 12, 1977

[51] Int. Cl.² .............................................. B32B 5/20
[52] U.S. Cl. .................... 156/73.1; 156/498; 156/580.2; 228/1 R; 165/2; 165/90; 264/23; 432/236
[58] Field of Search ................. 156/73.1, 580.1, 580.2, 156/498; 228/1 R, 110, 111; 264/23; 165/2, 90; 432/236

[56] References Cited
U.S. PATENT DOCUMENTS

| | | | |
|---|---|---|---|
| 2,354,714 | 8/1944 | Strickland | 156/73.1 |
| 2,582,581 | 1/1952 | Bona | 156/498 |
| 2,587,211 | 2/1952 | Piazze | 156/498 |
| 3,022,814 | 2/1962 | Bodine | 156/498 |
| 3,292,838 | 12/1966 | Farley | 228/1 |
| 3,529,660 | 9/1970 | Obeda | 228/1 |
| 3,831,341 | 8/1974 | Gauntlett | 156/580.2 |
| 3,939,033 | 2/1976 | Grgach et al. | 156/580.2 |

Primary Examiner—Edward G. Whitby
Attorney, Agent, or Firm—Charles E. Temko

[57] ABSTRACT

Means and method for preventing distortion in ultrasonic pattern rolls used for quilting layers of thermoplastic material by ultrasonic energy, whereby uniformity of seal quality is maintained. The method contemplates the distribution of heat generated in the roll during warmup over the entire mass of the roll to eliminate distortion from true cylindrical shape, whereby the tendency of the roll to bow out of round resulting in high and low areas with each revolution and the formation of correspondingly uneven welds is eliminated.

3 Claims, 1 Drawing Figure

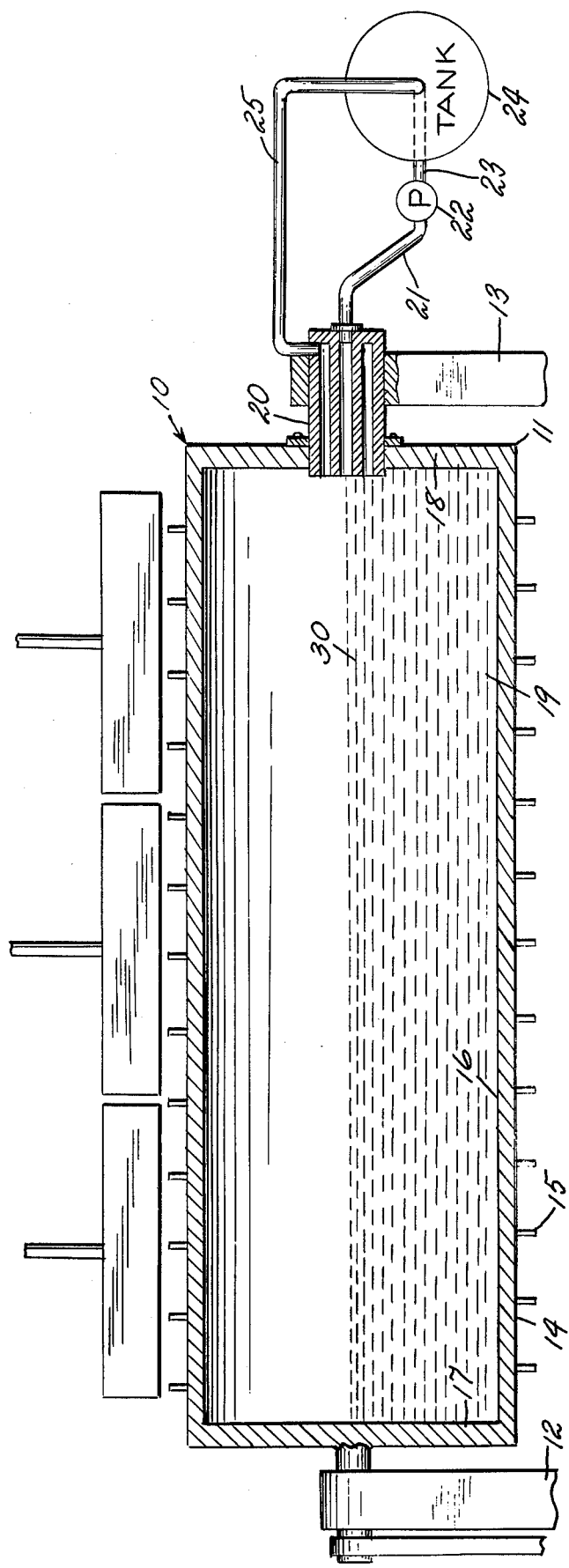

HEAT CONTROL FOR ULTRASONIC PATTERN ROLLS

BACKGROUND OF THE INVENTION

This invention relates generally to the field of ultrasonic welding of synthetic resinous planar materials using a rotating pattern roll and a relatively fixed horn, and more particularly to a means and method for maintaining uniformity of welds during substantially continuous operation.

In ultrasonic quilting, the heat generated to melt the fabric together is caused by the interference of sound waves. The heat is generated at the locus of points where a sound wave leaving the horn interferes with a wave that has been reflected by the pattern roll. The distance between the horn and the pattern roll thereby becomes fixed as a function of the wave length of the sonic energy. As a result, a variation of this gap distance of as little as 0.002 inch can be detected as a lighter or heavier weld.

In conventional running of ultrasonic sealing machines, the horn is forced down on a plurality of layers of material under varying degrees of air pressure, using different pressures to compensate for different thicknesses of fabric. In order to make this pressure gap condition constant for all portions of the pattern, the prior art practice has been to use patterns in which the sealing areas remain constant on the fabric passing beneath the anvil, so that there is a substantially constant power dissipation.

One manner in which pressure sensitivity may be avoided, so that a broader range of "unbalanced" patterns may be used, is to bring the horn down into pisition with much more air pressure than is normally required to make a proper weld, but to provide an adjustable mechanical stop which provides accurate maintenance of the proper gap.

When such a structure was first employed, it was discovered that the solution brought with it unforeseen complications. Conventional pattern rolls are not manufactured with sufficiently close tolerance to maintain the gap against a relatively fixed horn within plus or minus 0.001 inch as it rotates. When such a roll was manufactured, another, more serious, problem occurred. As the machine operates, a low grade heat builds up in the pattern roll which is of hollow configuration. Since the heat builds up in the welding areas, and is not dissipated at a sufficiently rapid rate, distortion occurs with thermal expansion, and results in bowing of the roll, so that it rotates eccentrically with high and low areas to vary the degree of welding accomplished from no weld at all to a burn through. Using a roller having an outer diameter of 10-½ inches and a wall thickness of approximately one inch, and 132 inches long, maximum deflections from true have been as much as 0.012 inch. It has been determined that the distortion is caused not by a simple rise in temperature, but by the fact that the roller warms during continued use in an uneven manner as a result of practical impossibility to manufacture the pattern roll with a uniform wall thickness. The situation is further complicated by the fact that the points at which heat enters the mass of the roller is determined by the pattern itself, and the problem manifests itself when running "unbalanced" pattern, i.e. those patterns which do not distribute sealing energy in a relative even manner.

SUMMARY OF THE INVENTION

Briefly stated, the invention contemplates the provision of means and method for controlling the dissipation of heat within the pattern roll, so that thermal expansion is relatively uniform as the roll heats with continued use. The roll is not maintained at any particular temperature, but is forced to warm slowly by dissipation of heat accumulated in the roller through the use of a fluid coolant, the coolant absorbing considerable heat in the process. In this manner, the roller may be continuously operated for long periods of time at temperatures well above initial starting temperature. Structurally, the result is accomplished using a dual flow rotary union in one end of the roll, connected in series with a small pump and a coolant reservoir. Using a roller of the above described size, a flow of as little as 1 gallon per minute provides adequate stabilization. During operation, the roll is approximately half full of coolant, and the inner surface of the longitudinal cylindrical wall thereof is continuously contacted as the roller rotates.

BRIEF DESCRIPTION OF THE DRAWING

In the dwawing, to which reference will be made in the specification, the FIGURE is a schematic view of an embodiment of the invention.

DETAILED DESCRIPTION OF THE DISCLOSED EMBODIMENT

In accordance with the invention, the device, generally indicated by reference character 10 is illustrated in the drawing as including a generally horizontally mounted pattern roll 11 supported on first and second bearings 12 and 13, respectively. The roll includes an outer cylindrical surface 14 having raised areas 15 where welding is accomplished in accordance with a predetermined pattern. The roll includes a smooth inner surface 16, and first and second end walls 17 and 18, respectively, which define a hollow cavity 19.

At one end wall there is provided a dual flow rotary union 20 of known type, connected by a conduit 21 to a pump 22, in turn connected by a conduit 23 to a reservoir tank 24 of approximately 25 gallon capacity. A return conduit 25 interconnects the tank with the union 20.

As seen in the drawing, the quantity 30 of coolant is sufficient to fill the cavity 19 to a level above the union 20, but substantially less than sufficient to completely fill the cavity. In this manner, heat generated during the welding process which occurs normally at the top of the roll is not immediately conducted from the welding surfaces, but residual heat remaining after the surface is no longer in contact with the material being quilted is absorbed by the coolant when the roll rotates to a degree where the surface opposite the sealing area is contacted by the coolant. The roll will thus warm with continued use at a relatively low rate, no portion of the roll expanding faster than another portion, due to the continuous distribution of residual heat by the coolant. As long as the heat of the roll remains at a reasonable operating temperature, say 100°–115° F., the pump 22 need not be operated. Once this reasonable operating temperature is exceeded, I have found that a circulation of as little as one gallon per minute is adequate to restore reasonable operating temperature, the excess heat being absorbed by the liquid in the reservoir 24. The function of the system is not so much continuous cooling as heat distribution to assure that all parts of the roll are maintained at equal temperatures.

I am, of course, aware that the cooling of various types of impression rollers, such as used in the printing industry is known. The problem in such cases is one of preventing excessive inking temperatures, rather than preventing minute distortions of the printing roll, as distinguished from assuring uniform expansion or dimensional change in the pattern roll during continuous use.

I wish it to be understood that I do not consider the invention limited to the precise details of structure shown and set forth in the specification, for obvious modifications will occur to those skilled in the art to which the invention pertains.

I claim:

1. In an ultrasonic welding device for use in quilting a plurality of thermoplastic laminae in accordance with a predetermined pattern, said device including a plurality of sonic horns and a cylindrical pattern roll having an outer surface positioned opposite said horns in predetermined spaced relation thereto to form a gap through which said laminae are passed during welding, improved means for maintaining said last mentioned spaced relation during operation by preventing thermal distortion of said roller, said means including: a supply of coolant filling substantially less than the hollow interior of said pattern roll, a coolant reservoir, conduit means interconnecting said reservoir with said interior, and means for circulating said coolant between said interior of said roll and said reservoir; whereby localized heat generated during welding at specific areas on the outer surface of said roll is distributed through the wall thereof to said coolant, and through rotation of said roll to the total mass thereof, said distribution preventing distortion of said roll as the same warms with use.

2. The method of preventing distortion in the operative surface of a hollow ultrasonic pattern roll as a result of heat accumulated in specific areas on said outer surface comprising the steps of:
   introducing a quantity of liquid coolant occupying substantially less than the total volume of said roller, whereby with rotation of said roller, portions thereof which are heated at a more rapid rate due to sealing operation are contacted on a corresponding inner surface thereof by said coolant, and absorbed heat is distributed to the remaining portions of said roll at a slow rate, and;
   controlling the temperature of said coolant to a maximum level above ambient temperature.

3. The method in accordance with claim 2, including the step of circulating said coolant outside said roll.

* * * * *